US012780153B2

(12) United States Patent
Okuma et al.

(10) Patent No.: US 12,780,153 B2
(45) Date of Patent: Nov. 3, 2026

(54) PASSIVE EXTERIOR CAMERA CLEANING SYSTEM UTILIZING PRESSURIZED CABIN AIR

(71) Applicant: Toyota Motor Engineering & Manufacturing North America, Inc., Plano, TX (US)

(72) Inventors: Jessica A. Okuma, Ypsilanti, MI (US); Kristin M. Zwirlein, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 54 days.

(21) Appl. No.: 18/827,516

(22) Filed: Sep. 6, 2024

(65) Prior Publication Data

US 2026/0070517 A1 Mar. 12, 2026

(51) Int. Cl.
*B60S 1/54* (2006.01)

(52) U.S. Cl.
CPC .................................... *B60S 1/542* (2013.01)

(58) Field of Classification Search
None
See application file for complete search history.

(56) References Cited

U.S. PATENT DOCUMENTS

| | | | |
|---|---|---|---|
| 9,538,054 | B2 | 1/2017 | Hayakawa et al. |
| 10,059,280 | B2 | 8/2018 | Cooper |
| 10,095,026 | B2 | 10/2018 | Eineren et al. |
| 10,807,569 | B2 | 10/2020 | Ghannam et al. |
| 11,279,287 | B2 | 3/2022 | Boegal et al. |
| 11,880,200 | B2 | 1/2024 | Avram et al. |
| 2022/0032878 | A1 | 2/2022 | Shawgo |
| 2022/0126790 | A1 | 4/2022 | Matsunaga |

FOREIGN PATENT DOCUMENTS

| | | | | |
|---|---|---|---|---|
| CN | 109413311 A | | 3/2019 | |
| CN | 114549936 A | * | 5/2022 | ............ G06F 18/22 |
| DE | 202021000474 U1 | | 8/2021 | |
| ES | 2316913 T3 | * | 4/2009 | ............ B60H 1/249 |

(Continued)

OTHER PUBLICATIONS

Google Patents translation of ES2316913T3 (Year: 2025).*

(Continued)

*Primary Examiner* — Eric W Golightly
(74) *Attorney, Agent, or Firm* — Snell & Wilmer LLP

(57) ABSTRACT

Methods, systems, and apparatus for an exterior camera cleaning system for a vehicle include an air inlet configured to receive a flow of air from a passenger compartment of the vehicle in response to an increase in an air pressure in the passenger compartment. An air outlet is in fluid communication with the air inlet. The air outlet is configured to direct the flow of air toward an exterior vehicle camera lens to remove debris therefrom. The air inlet can receive the flow of air in response to a passenger door of the vehicle being closed, which generates a positive pressure in the passenger compartment, which in turn is directed through the air outlet toward the exterior vehicle camera lens.

18 Claims, 7 Drawing Sheets

(56) References Cited

FOREIGN PATENT DOCUMENTS

| | | | | | |
|---|---|---|---|---|---|
| JP | 2012132988 | A | * | 7/2012 | |
| JP | 2020055377 | A | * | 4/2020 | ............ F02B 27/005 |
| KR | 20010055023 | A | | 7/2001 | |
| KR | 20200029913 | A | | 3/2020 | |
| KR | 20220061747 | A | | 5/2022 | |
| WO | 2023275691 | A1 | | 1/2023 | |
| WO | 2023277422 | A1 | | 1/2023 | |

OTHER PUBLICATIONS

Google Patents translation of JP2012132988A (Year: 2025).*
Goole Patents translation of CN114549936A (Year: 2025).*
Google Patents translation of JP2020055377A (Year: 2026).*

* cited by examiner

PASSIVE EXTERIOR CAMERA CLEANING SYSTEM UTILIZING PRESSURIZED CABIN AIR

BACKGROUND

Field

The present disclosure relates to vehicles having an exterior camera and more particularly to systems and methods for cleaning a vehicle exterior camera lens.

Description of the Related Art

Some vehicles include vehicle camera devices mounted on the front and/or rear of the vehicle. Vehicle camera devices installed on the front of the vehicle allow for a driver to observe and record the front direction. Vehicle camera devices installed on the rear of the vehicle allow for a driver to observe and record the rear direction. Vehicle camera devices are installed in various locations of the vehicle to allow for a driver to observe and record various directions. Various driving and environmental conditions (e.g., moisture, dust, road debris, etc.) can lead to moisture, dust, and/or debris adhering to the lens of the camera. When the residue adheres to the lens of the vehicle camera, the quality of the view provided by the vehicle camera can diminish and/or be obstructed.

Accordingly, it is desirable to provide systems, methods, and techniques for maintaining a clean vehicle camera lens.

SUMMARY

One aspect of the subject matter described in this disclosure may be embodied in an exterior camera cleaning system for a vehicle. The exterior camera cleaning system includes an air inlet and an air outlet in fluid communication with the air inlet. The air inlet is configured to receive a flow of air from a passenger compartment of the vehicle in response to an increase in an air pressure in the passenger compartment. The air outlet is configured to direct the flow of air toward an exterior vehicle camera lens.

In another aspect, the subject matter may be embodied in a vehicle. The vehicle may have a passenger compartment, a passenger door whereby the passenger compartment is accessible, and an exterior camera cleaning system. The exterior camera cleaning system may include an air inlet and an air outlet in fluid communication with the air inlet. The air inlet may be configured to receive a flow of air from the passenger compartment of the vehicle in response to an increase in an air pressure in the passenger compartment. The air outlet may be configured to direct the flow of air toward an exterior vehicle camera lens to remove a debris from the exterior vehicle camera lens.

These and other embodiments may optionally include one or more of the following features.

The air inlet can be configured to receive the flow of air from the passenger compartment of the vehicle in response to a passenger door of the vehicle moving to a closed position. The air pressure in the passenger compartment can increase in response to the passenger door of the vehicle moving to the closed position.

The air outlet can include a nozzle that directs the flow of air across the exterior vehicle camera lens.

The exterior camera cleaning system can further include a conduit extending between the air inlet and the air outlet and configured to direct the flow of air from the air inlet to the air outlet.

The exterior camera cleaning system can further include a cabin pressure relieve valve configured to direct the flow of air to the air inlet. The cabin pressure relieve valve can be in fluid communication with the passenger compartment. The flow of air can be diverted from the cabin pressure relieve valve.

The exterior camera cleaning system can further include a lens cleaning arm disposed relative to the exterior vehicle camera lens. The flow of air can be configured to cause the lens cleaning arm to translate with respect to the exterior vehicle camera lens to contact the exterior vehicle camera lens to remove a debris from the exterior vehicle camera lens. The flow of air can be configured to cause the lens cleaning arm to rotate with respect to the exterior vehicle camera lens to contact the exterior vehicle camera lens to remove a debris from the exterior vehicle camera lens.

In another aspect, the subject matter may be embodied in a method for cleaning an exterior vehicle camera. The method can include receiving a flow of air from a passenger compartment of a vehicle. The method can include directing the flow of air from the passenger compartment of the vehicle toward a lens of the exterior vehicle camera. The method can include removing a debris from the lens in response to the flow of air being directed toward the lens.

In various aspects, the removing the debris from the lens includes blowing away the debris with the flow of air.

In various aspects, the removing the debris from the lens includes translating a lens cleaning arm with respect to the lens using the flow of air.

In various aspects, the removing the debris from the lens includes rotating a lens cleaning arm with respect to the lens using the flow of air.

In various aspects, the method further includes closing a passenger door of the vehicle, and the flow of air is received from the passenger compartment of the vehicle in response to the closing the passenger door of the vehicle.

In various aspects, the method further includes generating a positive pressure in the passenger compartment of the vehicle, and the flow of air is received from the passenger compartment of the vehicle in response to the generating the positive pressure in the passenger compartment of the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, methods, devices, and/or vehicles for implementing a passive vehicle camera lens cleaning system. Aspects and/or embodiments are directed to providing a pressurized flow of air directed at an external vehicle camera lens to blow away and/or remove debris accumulated on the external vehicle camera lens and/or to prevent debris from accumulating on the external vehicle camera lens. The passive vehicle camera lens cleaning system may minimize the frequency the exterior camera lens requires cleaning, which can contribute to fewer instances where the driver may not have full peripheral/rearward (depending on the field of view of the exterior camera) awareness due to blind spots from dirtiness on the lens. The passive vehicle camera lens cleaning system may be designed to operate without any additional fluids or maintenance indefinitely.

The passive vehicle camera lens cleaning system can include a camera lens and a duct in fluid communication with a passenger compartment of the vehicle. In response to a user closing a passenger door of the vehicle, a pressure of the passenger compartment can rapidly increase thereby inducing or generating a flow of air directed from the passenger compartment, through the conduit, and expelled from a conduit outlet and directed to flow across the camera lens to blow debris away from the camera lens to minimize any dust/dirt/condensation accumulation. As described herein, the flow of air can be configured to cause a lens wiper apparatus to move to wipe away debris. By utilizing a duct, the camera is not required to be placed in any specific airstream path.

As used herein, the term "positive pressure" refers to a pressure that is greater than the pressure of the surrounding environment.

Figure 1:
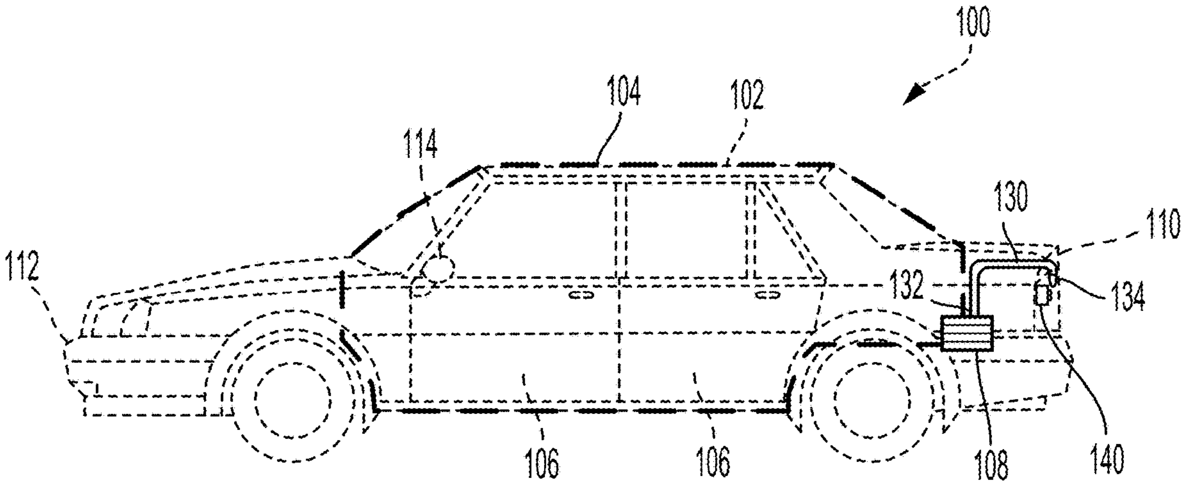
FIG. 1 is a schematic side view of a vehicle that is equipped with an exterior camera cleaning system, according to an aspect of the invention.

FIG. 1 is a side view of a vehicle 102 having a vehicle exterior camera cleaning system 100 in accordance with various aspects. The vehicle 102 may be a self-propelled wheeled conveyance, such as a car, a sport utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of electric/hybrid vehicle. Other examples of vehicles include bicycles, trains, planes, or boats, and any other form of conveyance that is capable of transportation. The vehicle 102 may be semi-autonomous or autonomous.

The vehicle 102 can include a passenger compartment 104 (also referred to as a cabin; outlined by a dashed line in FIG. 1) accessible by one or more passenger doors 106. The vehicle 102 can include a pressure relief valve 108 (also referred to herein as a cabin pressure relief valve) to relieve air pressure surges or peaks in the passenger compartment 104 which result for example, when a passenger door 106 is slammed shut or an airbag is inflated. The pressure relief valve 108 can include a rigid frame or housing which mounts in an aperture in a vehicle body panel. A wall of the housing extending generally parallel to the vehicle body panel has an opening through which air may pass. A valve element in the form of a normally flexible plastic flap can be connected to the housing to overlie the opening in the housing wall. The valve element can open relative to the housing to uncover the opening to relieve air pressure surges. The pressure relief valve 108 can include louvers that cover the valve element to make the pressure relief valve more visually pleasing. In response to a passenger door 106 being closed, a flow of air can flow from the passenger compartment 104 to a location external to the passenger compartment 104 via the pressure relief valve 108 to relieve air pressure surges or peaks in the passenger compartment 104.

In various aspects, the vehicle exterior camera cleaning system 100 generally includes a conduit 130 in fluid communication with passenger compartment 104. The conduit 130 can have an inlet 132 and an outlet 134 configured to direct a flow of air from the passenger compartment 104 to the exterior camera 140. In various aspects, the conduit 130 is in fluid communication with the passenger compartment 104 via the pressure relief valve 108. In various aspects, the conduit 130 is in fluid communication with the passenger compartment 104 independent of the pressure relief valve 108 (i.e., the conduit 130 bypasses the pressure relief valve 108 and/or the pressure relief valve 108 is omitted). In response to a passenger door 106 being closed, a flow of air can flow from the passenger compartment 104 through the conduit 130 to relieve air pressure surges or peaks in the passenger compartment 104 and/or to direct the flow of air toward an exterior camera 140 for cleaning.

In various aspects, in response to a passenger door 106 being closed, a positive pressure can be generated in the passenger compartment 104 (i.e., relative to the exterior environment of the vehicle 102). This positive pressure can induce a flow of air through the conduit 130. The conduit 130 can direct this flow of air to the exterior camera 140 for blowing or wiping away any debris accumulated thereon.

Figure 2A:
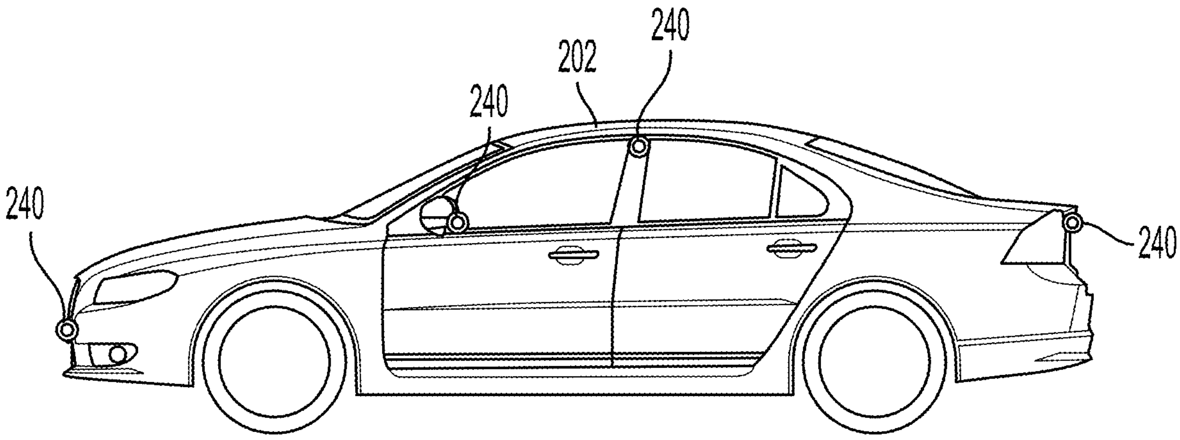
FIG. 2A, FIG. 2B, and FIG. 2C are schematic side, front, and rear views, respectively, showing various example locations for installing an exterior camera on a vehicle, according to various aspects of the invention.
Figure 2B:
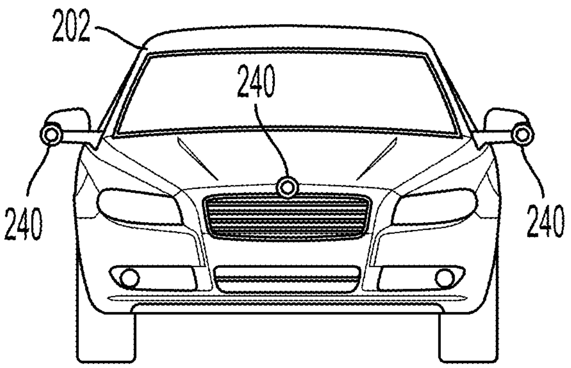
Figure 2C:
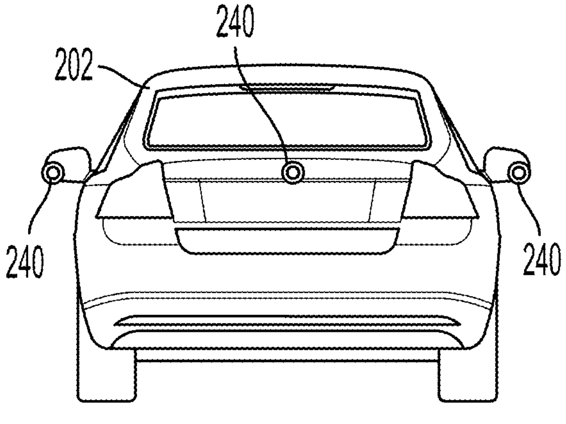

The exterior camera 140 can be installed at a rear end 110 of the vehicle 102 (e.g., a rear hatch or door, a rear bumper, etc.) as a rear-view camera. The exterior camera 140 can be installed in any suitable location of the vehicle 102, for example at a front fascia 112 of the vehicle 102, a sideview mirror 114 of the vehicle 102, or any other suitable location of the vehicle 102. In various aspects, the inlet 132 is located at a rear end of the passenger compartment 104. The conduit 130 can be routed from the passenger compartment 104 and/or the pressure relief valve 108 to the location of the exterior camera 140. FIG. 2A, FIG. 2B, and FIG. 2C are side, front, and rear views of a vehicle 202 showing example locations that an exterior camera 240 can be installed on the vehicle 202. In this regard, the conduit 130 of FIG. 1 can be routed to any suitable location of the vehicle 202 where an exterior camera 240 is installed.

In various aspects, the exterior camera 240 can be installed at any of the locations indicated in FIG. 2A through FIG. 2C (e.g., the sideview mirrors, the rear of the vehicle 202, the front of the vehicle 202, etc.) or any other suitable location. The exterior camera 240 and the air outlet of the camera cleaning system can both be at the front half of the vehicle 202 in various aspects. The exterior camera 240 and the air outlet of the camera cleaning system can both be at the rear half of the vehicle 202 in various aspects.

Figure 3:
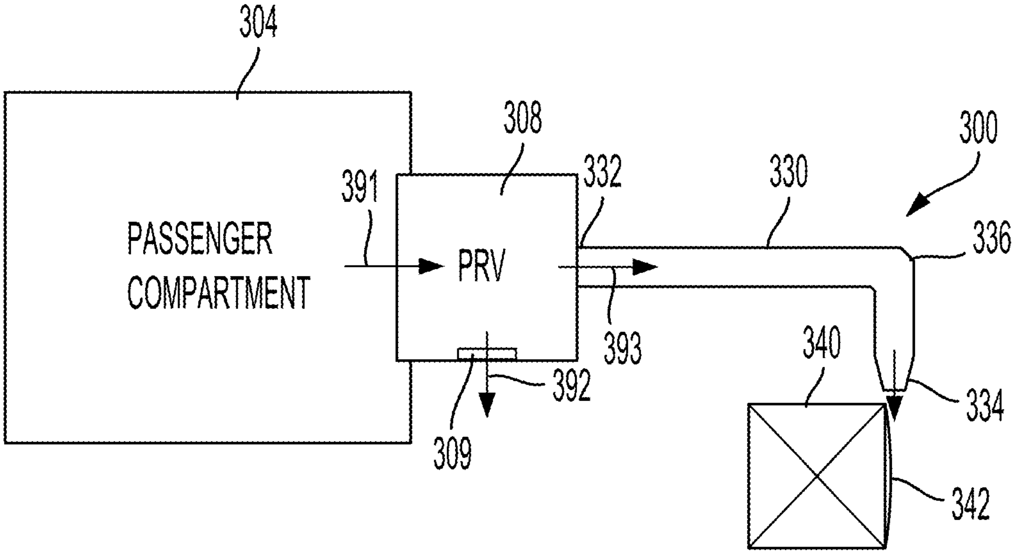
FIG. 3 is a schematic view of a vehicle exterior camera cleaning system, according to an aspect of the invention.

FIG. 3 is a schematic view of a vehicle exterior camera cleaning system 300 in accordance with various aspects. In various aspects, the cleaning system 300 is similar to the cleaning system 100 of FIG. 1. The cleaning system 300 generally includes a conduit 330 configured to direct a flow of air across a camera lens 342 of an exterior camera 340. The conduit 330 can include an inlet 332 configured to receive a flow of air. The conduit 330 can further include an air outlet 334. The conduit 330 can include one or more bends 336 between the air inlet 332 and the air outlet 334. The air outlet 334 can be positioned with respect to the camera lens 342. The air outlet 334 can be configured to direct the flow of air across the camera lens 342. The air outlet 334 can be a nozzle that directs the flow of air across the camera lens 342. For example, the air outlet 334 can converge to focus the flow of air across the camera lens 342 for blowing away debris accumulated thereon.

The inlet 332 can be configured to receive a flow of air from the passenger compartment 304 of a vehicle. In various aspects, the inlet 332 is in fluid communication with the passenger compartment 304 via a pressure relief valve 308. In response to a passenger door moving to a closed position, a positive pressure can be generated in the passenger compartment 304. This positive pressure can induce a flow of air 391 from the passenger compartment 304 into the pressure relief valve 308. In various aspects, some of the flow of air 391 can be diverted through an exit vent 309 of the pressure relief valve 308 and expelled to a location exterior from the passenger compartment 304 as a flow of air 392 to vent the pressurized air from the passenger compartment 304. In various aspects, some or all of the flow of air 391 can be diverted into the inlet 332 of the conduit 330 from the passenger compartment 304 as a flow of air 393 to vent the pressurized air from the passenger compartment 304 and/or to be directed toward the camera lens 342 for cleaning thereof.

In various aspects, the pressure relief valve 308 can be omitted and the entire flow of air 391 can be routed through the conduit 330. In various aspects, the pressure relief valve 308 can be included, but the exit vent 309 can be either closed or omitted and the entire flow of air 391 can be routed through the conduit 330. In this regard, the conduit 330 can be the exit of the pressure relief valve 308. In various aspects, the conduit 330 is the only exit of the pressure relief valve 308 whereby the entire flow of air 391 can be routed.

Figure 4:
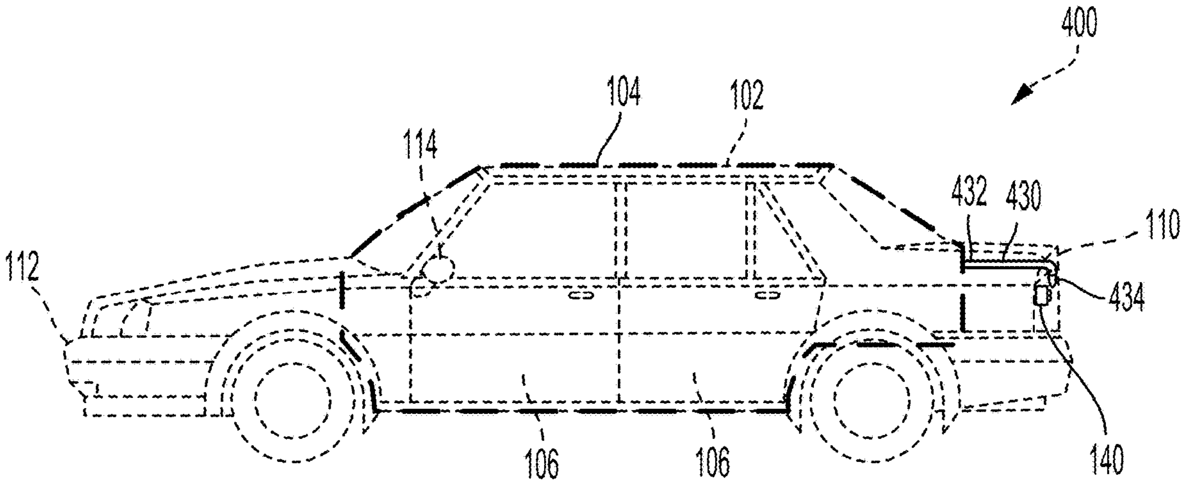
FIG. 4 is a schematic side view of a vehicle that is equipped with an exterior camera cleaning system, according to an aspect of the invention.

FIG. 4 is a side view of the vehicle 102 having a vehicle exterior camera cleaning system 400 in accordance with various aspects. In various aspects, the cleaning system 400 can be similar to the cleaning system 100 of FIG. 1, except that the inlet 432 of the conduit 430 is coupled directly to the passenger compartment 104. With respect to FIG. 4, elements with like element numbering, as depicted in FIG. 1, are intended to be the same and will not necessarily be repeated for the sake of clarity. In various aspects, a valve can be included at the inlet 432 to prevent reverse flow through the conduit 430 and/or to prevent sound from travelling from the exterior of the passenger compartment 104 into the interior of the passenger compartment 104.

Figure 5A:
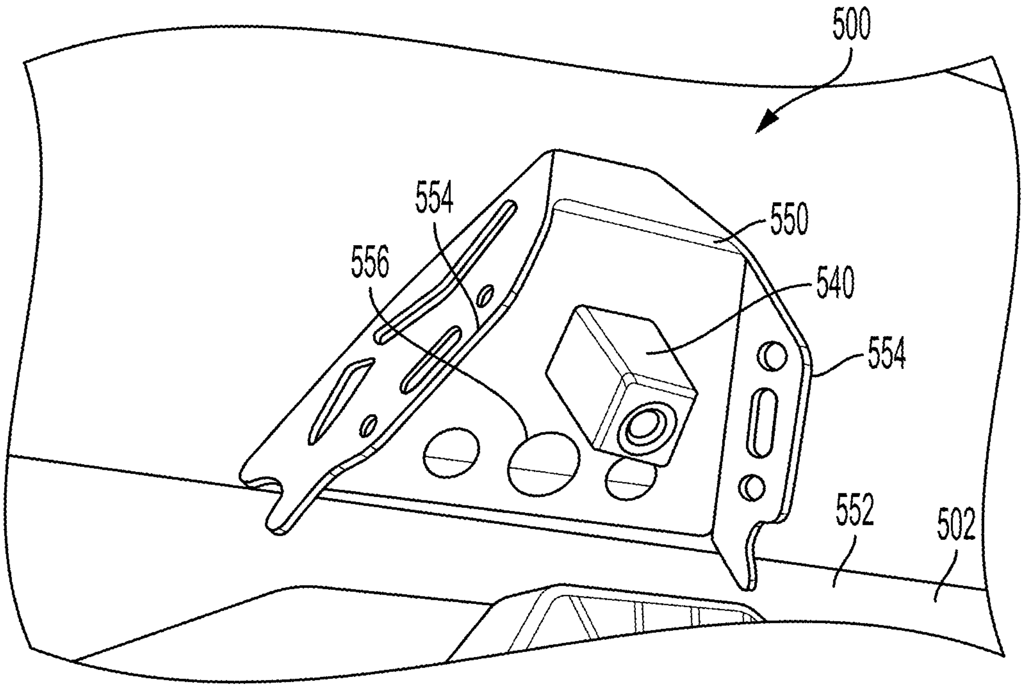
FIG. 5A is a perspective view of an exterior camera installed on a support bracket of a vehicle, according to an aspect of the invention.

FIG. 5A is a perspective view of an exterior camera 540 mounted to a vehicle 502, in accordance with various aspects. The exterior camera 540 can be mounted to the vehicle 502 via a support bracket 550. In various aspects, the support bracket 550 is mounted to a bumper 552 of the vehicle 502. The bumper 552 can be a rear bumper of the vehicle 502. In this regard, the exterior camera 540 can be a rear-facing camera. The support bracket 550 can include a pair of opposing flanges 554. An air aperture 556 can be disposed in the support bracket 550. The air aperture 556 can be located between the opposing flanges 554.

Figure 5B:
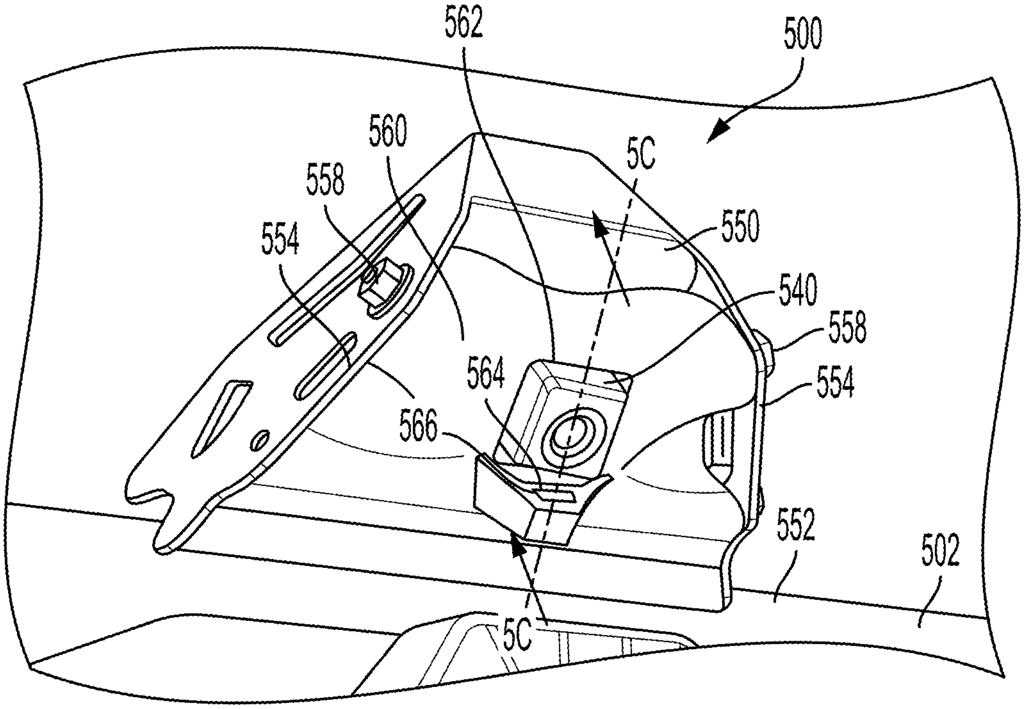
FIG. 5B is a perspective view of an air cowl of an exterior camera lens cleaning system installed with respect to the exterior camera of FIG. 5A, according to an aspect of the invention.

FIG. 5B is a perspective view of the exterior camera 540 mounted to the vehicle 502 with an exterior camera cleaning system 500 installed, in accordance with various aspects. The camera cleaning system 500 generally includes an air cowl 560 configured to be mounted relative to the exterior vehicle camera 540. The air cowl 560 can be mounted to the support bracket 550. The air cowl can be coupled to the pair of opposing flanges 554 via a pair of fasteners 558.

The air cowl 560 can include an aperture 562 (also referred to herein as a camera aperture) configured to receive the exterior camera 540. The exterior camera 540 can extend through the aperture 562. The air cowl 560 can include a channel 564 configured to direct a flow of air toward a lens of the exterior camera 540. An outlet 566 of the channel 564 can be located at the exterior camera 540. In various aspects, the outlet 566 is oriented generally perpendicular (e.g., 90 degrees plus or minus 20 degrees) to the aperture 562.

Figure 5C:
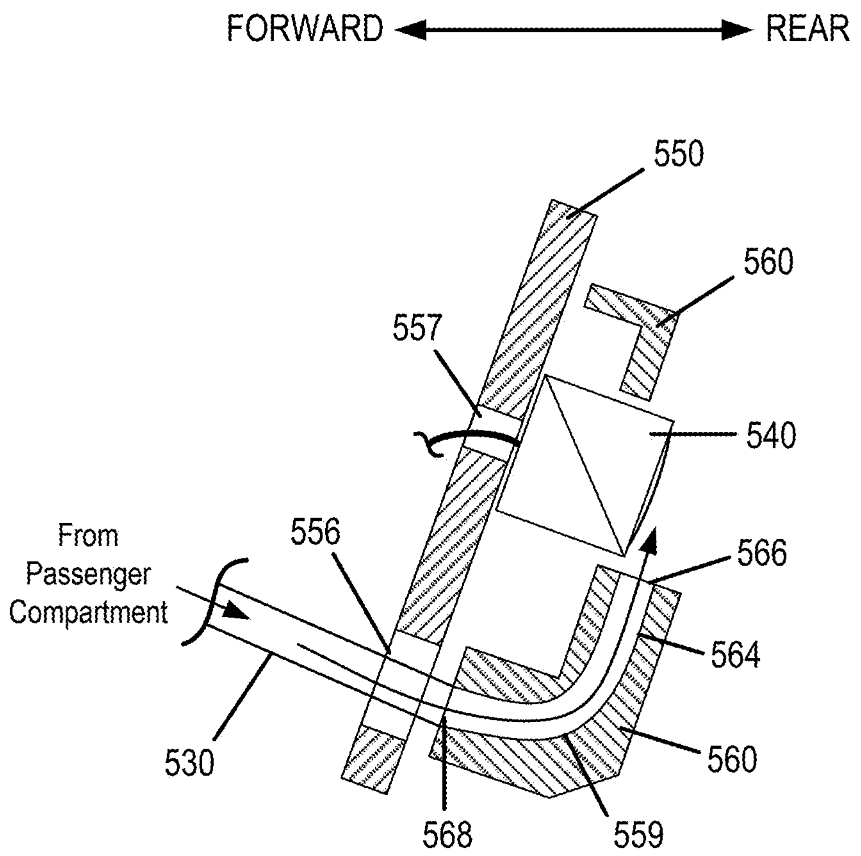
FIG. 5C is a section view of the exterior camera lens cleaning system of FIG. 5B, according to an aspect of the invention.

FIG. 5C is a section view of the exterior camera cleaning system 500 of FIG. 5B. The channel 564 can include an air inlet 568 configured to receive a flow of air from a passenger compartment in response to a passenger door closing on the vehicle 502. In this regard, the air inlet 568 can be in fluid communication with a passenger compartment as described with respect to FIG. 1, FIG. 3, and/or FIG. 4. The air inlet 568 can be aligned with the air aperture 556 so that a conduit 530 can pass therethrough to direct the air flow through the air aperture 556 and into the air inlet 568. The channel can include one or more bends 559 located between the inlet 568 and the outlet 566 to redirect a direction of the flow of air. In various aspects, the channel 564 is substantially L-shaped as illustrated in FIG. 5C. The conduit 530 can be coupled to the channel 564 so that the flow of air exits the conduit 530 into the channel 564.

In various aspects, the bracket 550 further includes an aperture 557 configured to receive one or more wires from the exterior camera 540. The aperture 557 can be partially covered by the exterior camera 540 when the exterior camera 540 is in an installed position.

Figure 6:
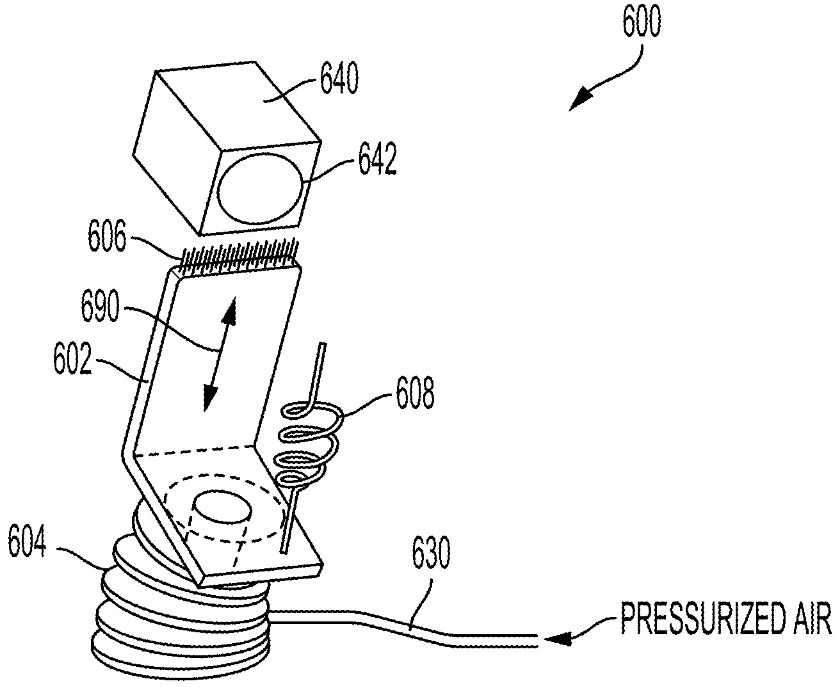
FIG. 6 is a schematic view of an exterior camera lens cleaning system having a translating lens cleaning arm, according to an aspect of the invention.

FIG. 6 is an air-powered lens cleaning mechanism 600 for an exterior camera 640. The lens cleaning mechanism 600 can be operated with any of the exterior camera cleaning systems described herein. For example, the lens cleaning mechanism 600 can receive a flow of air from a conduit of the cleaning system 100 (see FIG. 1), from a conduit of the cleaning system 300 (see FIG. 3), or the channel of the cleaning system 500 (see FIG. 5B and FIG. 5C).

The lens cleaning mechanism 600 generally includes a translating lens cleaning arm 602 mounted to an air bellows 604. In response to the air bellows 604 receiving pressurized air via the conduit 630, the air bellows 604 moves from a retracted state to an extended state with respect to the camera lens 642, for example along the direction of arrow 690. The lens cleaning arm 602 can include a lens cleaning contact surface 606, such as a brush or squeegee, which contacts the lens 642 to remove any debris accumulated thereon in response to the air bellows 604 moving from the retracted state to the extended state. In various aspects, the lens cleaning mechanism 600 further includes a return spring 608 configured to bias the air bellows 604 to the retracted position so that the camera lens 642 is not obstructed. The return spring 608 can be coupled to the lens cleaning arm 602. The lens cleaning arm 602 can be made of plastic, metal, rubber, or a composite material.

Figure 7:
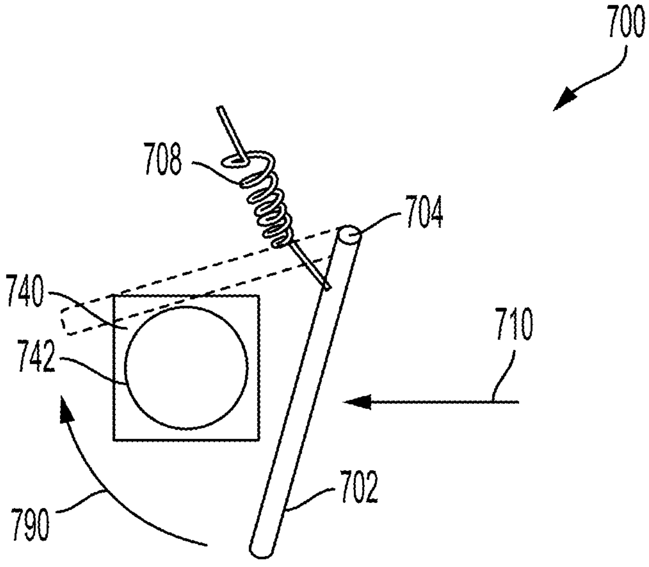
FIG. 7 is a schematic view of an exterior camera lens cleaning system having a pivoting lens cleaning arm, according to an aspect of the invention.

FIG. 7 is an air-powered lens cleaning mechanism 700 for an exterior camera 740. The lens cleaning mechanism 700 can be operated with any of the exterior camera cleaning systems described herein. For example, the lens cleaning mechanism 700 can receive a flow of air 710 from a conduit of cleaning system 200 (see FIG. 2), from any of the cleaning systems depicted in FIG. 3A through FIG. 3D, or from the channel of the cleaning system 500 (see FIG. 5B and FIG. 5C).

The lens cleaning mechanism 700 generally includes a pivoting lens cleaning arm 702 pivotally mounted to a fixed structure 704. In response to the lens cleaning arm 702 receiving pressurized air from the exterior camera cleaning system (e.g., a channel or a conduit), the lens cleaning arm 702 is biased to move from a first rotational position (shown in solid lines in FIG. 7) to a second rotational position (shown in dashed lines in FIG. 7) with respect to the camera lens 742, for example along the direction of arrow 790. The lens cleaning arm 702 can include a lens cleaning contact surface, such as a brush or squeegee, which contacts the lens 742 to remove any debris accumulated thereon in response to the lens cleaning arm 702 moving between the first rotational position and the second rotational position. In various aspects, the lens cleaning mechanism 700 further includes a return spring 708 configured to bias the lens cleaning arm 702 toward the first rotational position so that the lens cleaning arm 702 is automatically reset for the next flow of pressurized air. The lens cleaning arm 702 can clean the lens 742 when moving from the first rotational position to the second rotational position and when moving from the second rotational position to the first rotational position. In various aspects, the lens cleaning arm 702 moves to the second rotational position when the passenger compartment air pressure surges (e.g., in response to a passenger door being slammed shut) and the flow of air 710 overcomes the bias of the return spring 708 to rotate the lens cleaning arm 702 toward the second rotational position. In various aspects, the lens cleaning arm 702 returns to the first rotational position when the bias of the return spring 708 overcomes the flow of pressurized air 710 and/or the flow of pressurized air 710 stops. In this regard, the return spring 708 biases the lens cleaning arm 702 toward the first rotational position. The return spring 708 can be coupled to the lens cleaning arm 702. The lens cleaning arm 702 can be made of plastic, metal, rubber, or a composite material.

With momentary reference to FIG. 3, a method for cleaning an exterior vehicle camera 340 can include receiving a flow of air 393 from a passenger compartment 304 of a vehicle. The method can include directing the flow of air 393 from the passenger compartment 304 of the vehicle toward a lens 342 of the exterior vehicle camera 340. The method can include removing a debris from the lens 342 in response to the flow of air 393 being directed toward the lens 342.

In various aspects, removing the debris from the lens 342 includes blowing away the debris with the flow of air. In various aspects, removing the debris from the lens 342 includes translating a lens cleaning arm with respect to the lens using the flow of air (e.g., see FIG. 6). In various aspects, the removing the debris from the lens 342 includes rotating a lens cleaning arm with respect to the lens using the flow of air (e.g., see FIG. 7).

In various aspects, the method further includes closing a passenger door of the vehicle (e.g., see passenger door 106 of vehicle 102 of FIG. 1), and the flow of air 393 is received from the passenger compartment 304 of the vehicle in response to the closing the passenger door of the vehicle.

In various aspects, the method further includes generating a positive pressure in the passenger compartment 304 of the vehicle, and the flow of air 393 is received from the passenger compartment 304 of the vehicle in response to the generating the positive pressure in the passenger compartment 304 of the vehicle.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. An exterior camera cleaning system for a vehicle, comprising:
- an air inlet configured to receive a flow of air from a passenger compartment of the vehicle in response to an increase in an air pressure in the passenger compartment;
- an air outlet in fluid communication with the air inlet, the air outlet configured to direct the flow of air toward an exterior vehicle camera lens; and
- a lens cleaning arm disposed relative to the exterior vehicle camera lens;
- wherein the flow of air is configured to cause the lens cleaning arm to at least one of:
  - translate with respect to the exterior vehicle camera lens to contact the exterior vehicle camera lens to remove a debris from the exterior vehicle camera lens; or
  - rotate with respect to the exterior vehicle camera lens to contact the exterior vehicle camera lens to remove the debris from the exterior vehicle camera lens.

2. The exterior camera cleaning system of claim 1, wherein the air inlet is configured to receive the flow of air from the passenger compartment of the vehicle in response to a passenger door of the vehicle moving to a closed position.

3. The exterior camera cleaning system of claim 1, wherein the air outlet includes a nozzle that directs the flow of air across the exterior vehicle camera lens.

4. The exterior camera cleaning system of claim 1, further comprising a conduit extending between the air inlet and the air outlet and configured to direct the flow of air from the air inlet to the air outlet.

5. The exterior camera cleaning system of claim 1, wherein the flow of air is diverted from a cabin pressure relief valve.

6. The exterior camera cleaning system of claim 1, further comprising a cabin pressure relief valve configured to direct the flow of air to the air inlet, such that at least a portion of air vented by the cabin pressure relief valve is diverted to the air outlet for cleaning the exterior vehicle camera lens.

7. A vehicle comprising:
- a passenger compartment;
- a passenger door whereby the passenger compartment is accessible;
- an exterior camera cleaning system including:
  - an air inlet configured to receive a flow of air from the passenger compartment of the vehicle in response to an increase in an air pressure in the passenger compartment;
  - an air outlet in fluid communication with the air inlet, the air outlet configured to direct the flow of air toward an exterior vehicle camera lens to remove a debris from the exterior vehicle camera lens; and a lens cleaning arm disposed relative to the exterior vehicle camera lens, wherein the flow of air is configured to cause the lens cleaning arm to at least one of:

translate with respect to the exterior vehicle camera lens to contact the exterior vehicle camera lens to remove the debris from the exterior vehicle camera lens; or rotate with respect to the exterior vehicle camera lens to contact the exterior vehicle camera lens to remove the debris from the exterior vehicle camera lens.

8. The vehicle of claim 7, wherein the air inlet is configured to receive the flow of air from the passenger compartment of the vehicle in response to the passenger door of the vehicle moving to a closed position.

9. The vehicle of claim 8, wherein the air pressure in the passenger compartment increases in response to the passenger door of the vehicle moving to the closed position.

10. The vehicle of claim 7, further comprising a cabin pressure relief valve in fluid communication with the passenger compartment, wherein the cabin pressure relief valve is configured to direct the flow of air to the air inlet.

11. The vehicle of claim 7, further comprising a conduit extending between the air inlet and the air outlet and configured to direct the flow of air from the air inlet to the air outlet.

12. The exterior camera cleaning system of claim 1, wherein the air inlet and the air outlet are fluidly connected by a dedicated conduit extending from the passenger compartment to the exterior vehicle camera lens.

13. The exterior camera cleaning system of claim 1, further comprising a cabin pressure relief valve, wherein the air inlet is fluidly coupled to the cabin pressure relief valve downstream of a valve element configured to open in response to a pressure increase in the passenger compartment.

14. The exterior camera cleaning system of claim 4, wherein the conduit defines an outlet path of a cabin pressure relief valve.

15. The exterior camera cleaning system of claim 1, wherein the air inlet is positioned at a rear portion of the passenger compartment.

16. The exterior camera cleaning system of claim 1, wherein the air outlet is oriented to direct the flow of air toward the exterior vehicle camera lens at an angle transverse to the lens surface.

17. The exterior camera cleaning system of claim 1, further comprising an air cowl mounted to a support bracket of the exterior vehicle camera, the air cowl defining a channel configured to direct the flow of air from the air inlet to the air outlet.

18. The vehicle of claim 7, wherein the exterior camera cleaning system further includes an air cowl mounted to a support bracket of the exterior vehicle camera, the air cowl defining a channel configured to direct the flow of air from the air inlet to the air outlet.

* * * * *